United States Patent
Lu et al.

(10) Patent No.: US 12,263,857 B2
(45) Date of Patent: Apr. 1, 2025

(54) METHOD FOR ASSISTING SAFER DRIVING AND ELECTRONIC DEVICE

(71) Applicant: HON HAI PRECISION INDUSTRY CO., LTD., New Taipei (TW)

(72) Inventors: Chih-Te Lu, New Taipei (TW); Chieh Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 331 days.

(21) Appl. No.: 18/096,476

(22) Filed: Jan. 12, 2023

(65) Prior Publication Data
US 2023/0415760 A1    Dec. 28, 2023

(30) Foreign Application Priority Data
Jun. 22, 2022  (CN) .......................... 202210714371.0

(51) Int. Cl.
*B60W 50/14*    (2020.01)
*B60W 40/072*   (2012.01)
*B60W 40/105*   (2012.01)
*G06T 7/50*     (2017.01)
(Continued)

(52) U.S. Cl.
CPC .......... *B60W 50/14* (2013.01); *B60W 40/072* (2013.01); *B60W 40/105* (2013.01);
(Continued)

(58) Field of Classification Search
CPC .. B60W 50/14; B60W 40/072; B60W 40/105; B60W 2050/143; B60W 2420/403; B60W 2520/06; B60W 2540/18; B60W 2552/30; B60W 2520/10; G06T 7/50; G06T 2207/10024; G06T 2207/10028; G06T 2207/20081; G06T 2207/20084;
(Continued)

(56) References Cited

U.S. PATENT DOCUMENTS

| | | | |
|---|---|---|---|
| 11,618,438 B2* | 4/2023 | Srivatsa | .............. G06F 18/2148 701/28 |
| 2023/0033177 A1* | 2/2023 | Goel | ...................... G06V 20/58 |

(Continued)

OTHER PUBLICATIONS

Y. Zeng et al., "RT3D: Real-Time 3-D Vehicle Detection in LiDAR Point Cloud for Autonomous Driving," in IEEE Robotics and Automation Letters, vol. 3, No. 4, pp. 3434-3440, Oct. 2018, doi: 10.1109/LRA.2018.2852843. (Year: 2018).*

*Primary Examiner* — Quan Zhen Wang
*Assistant Examiner* — Rajsheed O Black-Childress
(74) *Attorney, Agent, or Firm* — ScienBiziP, P.C.

(57) ABSTRACT

A method for assisting safer riving applied in a vehicle-mounted electronic device obtains RGB images of a scene in front of a vehicle when engine is running, processes the RGB images by a trained depth estimation model, obtains depth images and converts the depth images to three-dimensional (3D) point cloud maps. A curvature of the driving path of the vehicle is calculated, and 3D regions of interest of the vehicle are extracted from the 3D point cloud maps according to a size of the vehicle and the curvature or deviation from straight ahead. The 3D regions of interest are analyzed for presence of obstacles. When no obstacles are present, the vehicle is controlled to continue driving, when presence of at least one obstacle is determined, an alarm is issued.

20 Claims, 5 Drawing Sheets

(51) Int. Cl.
*G06V 10/25* (2022.01)
*G06V 10/56* (2022.01)
*G06V 10/82* (2022.01)
*G06V 20/58* (2022.01)

(52) U.S. Cl.
CPC ............... *G06T 7/50* (2017.01); *G06V 10/25* (2022.01); *G06V 10/56* (2022.01); *G06V 10/82* (2022.01); *G06V 20/58* (2022.01); *B60W 2050/143* (2013.01); *B60W 2420/403* (2013.01); *B60W 2520/06* (2013.01); *B60W 2540/18* (2013.01); *B60W 2552/30* (2020.02); *G06T 2207/10024* (2013.01); *G06T 2207/10028* (2013.01); *G06T 2207/20081* (2013.01); *G06T 2207/20084* (2013.01); *G06T 2207/30261* (2013.01)

(58) Field of Classification Search
CPC . G06T 2207/30261; G06T 2207/10016; G06T 2207/20076; G06T 7/73; G06T 7/80; G06V 10/25; G06V 10/56; G06V 10/82; G06V 20/58; G06V 20/647; G06V 10/26; G06V 10/764; G06N 3/08
See application file for complete search history.

(56) References Cited

U.S. PATENT DOCUMENTS

2023/0415779 A1\* 12/2023 Chien .................... G06V 20/64
2024/0246570 A1\* 7/2024 Guo ...................... B60W 40/06
2025/0010880 A1\* 1/2025 Wengert .............. B60W 40/103

\* cited by examiner

METHOD FOR ASSISTING SAFER DRIVING AND ELECTRONIC DEVICE

This application claims priority to Chinese Patent Application No. 202210714371.0 filed on Jun. 22, 2022, in China National Intellectual Property Administration, the contents of which are incorporated by reference herein.

FIELD

The subject matter herein generally relates to an autonomous driving field, in particular, relates to a method for assisting safer driving and an electronic device.

BACKGROUND

In a field of autonomous driving, when a vehicle is driving, it is necessary to detect whether there are obstacles on the way of the vehicle, and if there are obstacles, safety measures will be activated, such as emergency braking or issuing an alarm. However, when detecting obstacles, the vehicle cannot accurately distinguish ranges of the obstacles, resulting in unsafe driving and poor driving experience for users.

BRIEF DESCRIPTION OF THE DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 1:
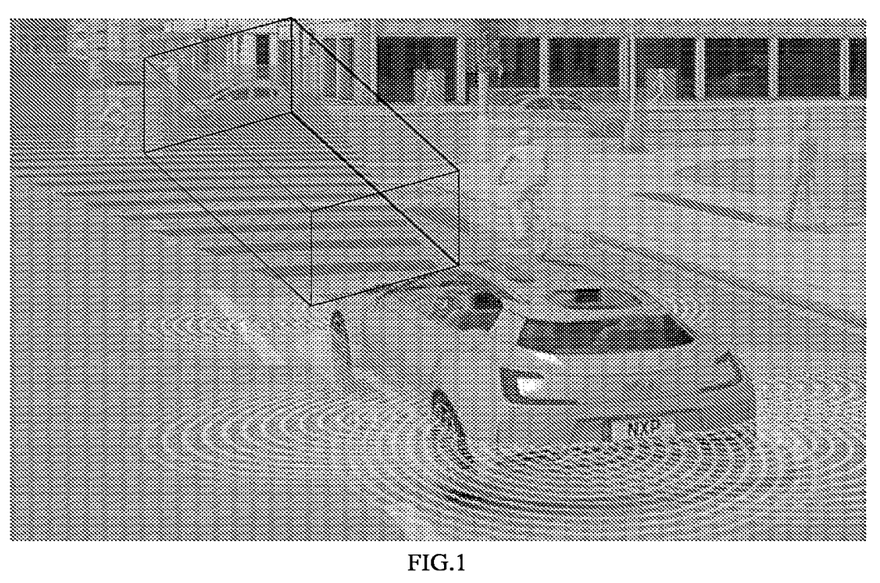
FIG. 1 is an application scene diagram of a method for assisting safer driving according to an embodiment of the present disclosure.

FIG. 1 illustrates an application scene diagram of a method for assisting safer driving. A Three-Dimensional (3D) box in an image as shown in FIG. 1 is a 3D region of interest in which the vehicle drives in a straight line. Only the objects in the 3D region of interest will be determined as obstacles, and other regions of the image will not be considered.

Figure 2:
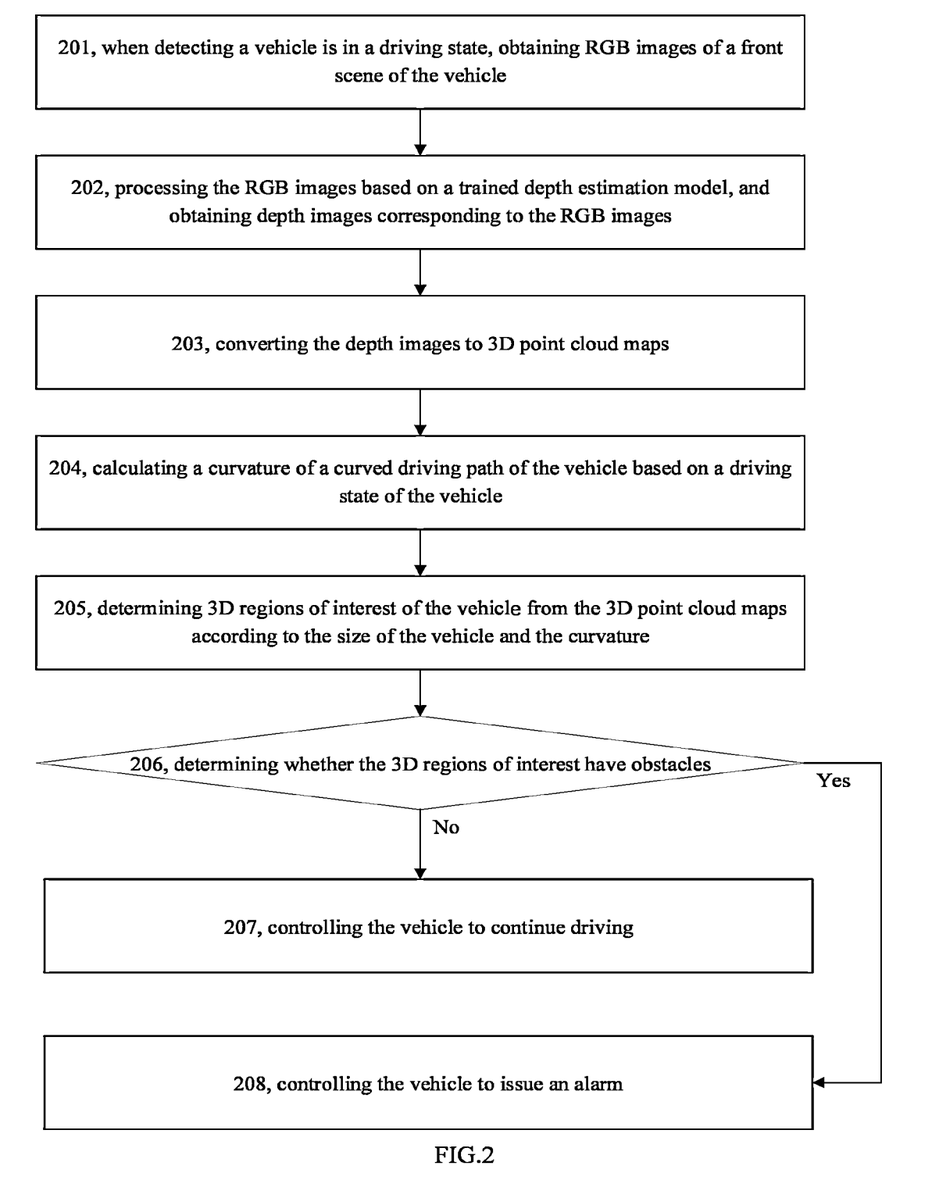
FIG. 2 is a flowchart of one embodiment of the method for assisting safer driving of FIG. 1.

FIG. 2 illustrates the method for assisting safer driving. The method can be applied to a vehicle, and for the vehicle having assistance in safer driving, the function provided by the method of the present application can be directly integrated on the vehicle, or the method can run on the vehicle in the form of a Software Development Kit (SDK).

Figure 5:
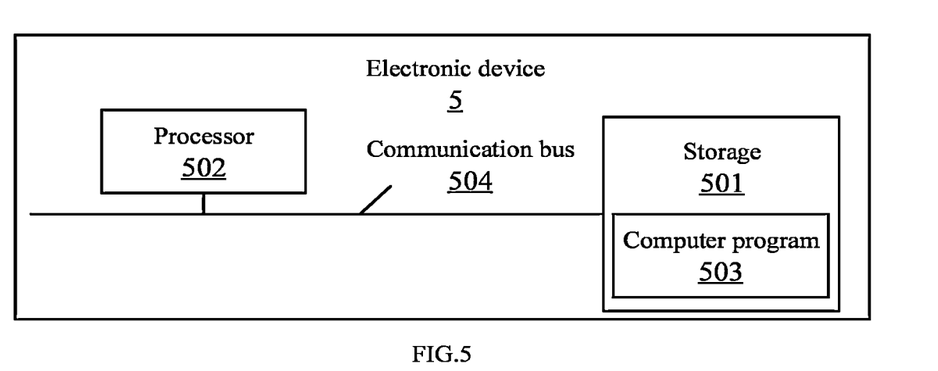
FIG. 5 is a schematic diagram of one embodiment of an electronic device according to the present disclosure.

In one embodiment, the method is applied in a vehicle-mounted electronic device (referring to FIG. 5). The electronic device connects to the vehicle. The electronic device can be any electronic product that can interact with a user, such as a personal computer, a tablet computer, a smart phone, a Personal Digital Assistant (PDA), a game console, an Internet Protocol Television (IPTV), a smart wearable device, etc.

The electronic device is a device that can automatically perform numerical calculation and/or information processing according to pre-set or stored instructions, and its hardware includes, but is not limited to, a microprocessor, an Application Specific Integrated Circuit (ASIC), a Field-Programmable Gate Array (FPGA), a Digital Signal Processor (DSP), an embedded device, etc.

In one embodiment, the electronic device may also include a network device and/or a user device. The network device includes, but is not limited to, a single network server, a server group consisting of multiple network servers, or a cloud server consisting of a large number of hosts or network servers.

A network connected to the electronic device includes, but is not limited to, the Internet, a wide area network, a metropolitan area network, a local area network, a Virtual Private Network (VPN), etc.

The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, when detecting a vehicle is in a driving state, RGB images of a front scene of the vehicle are obtained.

In one embodiment, detecting whether the vehicle is in a driving state includes: detecting whether a pointer of a tachometer on an instrument panel of the vehicle is on a "0" speed of the scale; when the pointer of the tachometer points on the "0" speed scale, it is determined that the vehicle is not moving; when the pointer of the tachometer shows engine speed other than "0", it is determined that the vehicle is in the driving state.

In one embodiment, obtaining the RGB images of the front scene of the vehicle includes: obtaining the RGB images of the front scene of the vehicle by a camera. For example, the RGB images of the front scene of the vehicle are captured by the camera mounted on the vehicle.

In one embodiment, when detecting that the vehicle is in the driving state, the camera of the vehicle is activated to shoot images of the scene in front of the vehicle, and the RGB images are obtained.

At block 202, the RGB images are processed based on a trained depth estimation model, and depth images corresponding to the RGB images are obtained.

In one embodiment, the depth estimation model includes a depth estimation convolutional neural network and a pose estimation convolutional neural network. In one embodiment, the depth estimation convolutional neural network includes first input layers, first convolutional layers, and deconvolutional layers. The pose estimation convolutional neural network includes second input layers, and second convolutional layers.

In one embodiment, the method includes training the depth estimation model. In one embodiment, training the depth estimation model includes:

obtaining training images; inputting the training images into the depth estimation convolutional neural network, and obtaining the depth images corresponding to the training images; inputting adjacent frame images of the training images into the pose estimation convolutional neural network, and obtaining the pose information of the camera corresponding to the adjacent frame images; reconstructing the training images based on the depth images, the pose information of the camera, and internal parameters of the camera corresponding to the RGB images, and obtaining reconstructed images; calculating loss values between the training images and the reconstructed images by using a preset loss function, adjusting the parameters of the depth estimation model to minimize the loss values, and obtaining the trained depth estimation model.

In one embodiment, the method further includes: performing data augmentation operations on the training images, and obtaining more training images as training samples. In one embodiment, the data augmentation operations include, but are not limited to, flipping images, rotating the images, scaling the images, and cropping the images. By performing the data enhancement operations on the training images, the training samples can be effectively expanded, and the depth estimation model can be trained and optimized using more training images from different scenarios, thereby making the depth estimation model more robust and accurate.

In one embodiment, inputting the training images into the depth estimation convolutional neural network and obtaining the depth images corresponding to the training images includes:

inputting the training images into the depth estimation convolutional neural network by the first input layers of the depth estimation convolutional neural network, and performing convolution operations on the training images by the first convolutional layers, and obtaining a feature map of the training images; inputting the feature map into the deconvolution layers of the depth estimation convolutional neural network, and performing deconvolution operations, obtaining a target feature map after deconvolution operations, and mapping each pixel in the target feature map to a corresponding depth value of the each pixel, and obtaining the depth images, and outputting the depth images corresponding to the training images.

In one embodiment, the adjacent frame image of one training image can include a previous frame image of the training image or a next frame image of the training image. For example, the training image is captured at time t, the adjacent frame image at time tis the training image at time (t+1) or the training image at time (t−1), wherein time t, time (t+1), time (t−1) corresponds to different frame images. It should be noted that the training images are the RGB images.

In one embodiment, inputting adjacent frame images of the training images into the pose estimation convolutional neural network and obtaining the pose information of camera corresponding to the adjacent frame images includes: inputting the adjacent frame images of the training images into the pose estimation convolutional neural network by the second input layers of the pose estimation convolutional neural network, and performing the convolution operations on the adjacent frame images by the second convolutional layers of the pose estimation convolutional neural network, and obtaining the pose information of the camera of the adjacent frame images. In one embodiment, the pose information of the camera includes a rotation matrix and a translation matrix, the matrices being represented by six degrees of freedom. In one embodiment, the pixel coordinates in the training image determine the corresponding pixel coordinates in the adjacent frame images by the pose information of the camera.

In one embodiment, the method includes: calculating the reconstructed images according to a formula $P_{t+1} = K\hat{T}_{t \to t+1} \hat{D}(P_t) K^{-1} P_t$, wherein $P_{t+1}$ represents one reconstructed image, K represents the internal parameters of the camera, $\hat{T}_{t \to t+1}$ represents the pose estimation value (pose information) of the adjacent frame images, $\hat{D}(P_t)$ represents the depth value of a pixel coordinate $P_t$, and $P_t$ represents the pixel coordinate of the training images. In one embodiment, the internal parameters of the camera can be a parameter matrix, and then $K^{-1}$ represents an inverse matrix of the parameter matrix of the internal parameters of the camera.

In one embodiment, the method further includes: calculating the loss values between the training images and the reconstructed images with a preset loss function, adjusting the parameters of the depth estimation model to minimize the loss values, and obtaining the trained depth estimation model.

In one embodiment, the preset loss function can be $$L = \frac{1}{M} \sum_t \left( \frac{1}{N} \sum_p |I_t(p) - I_{t+1}(p)|^2 \right),$$

wherein $I_t(p)$ represents the pixel coordinates of the training images, $I_{t+1}(p)$ represents the pixel coordinates of the reconstructed images, N represents a number of pixel coordinates, and N represents a number of the training images.

In one embodiment, the parameters of the depth estimation model refer to the initialization configuration parameters of the depth estimation convolutional neural network and the pose estimation convolutional neural network. For example, the parameters of the depth estimation model include the number of layers of the first convolutional layers and the number of the deconvolutional layers in the depth estimation convolutional neural network, and a size of convolutional kernels of the first convolutional layers and a size of convolutional kernels of the deconvolutional layers. In one embodiment, the parameters of the depth estimation model further includes the number of layers of the second convolutional layers in the pose estimation convolutional neural network and the size of a convolutional kernels in the second convolutional layers.

In one embodiment, after the training of the depth estimation model is done and the trained depth estimation model is obtained, the RGB images are input into the trained depth estimation model, and the depth images corresponding to the RGB images are output.

At block 203, the depth images are converted to 3D point cloud maps.

In one embodiment, converting the depth images to 3D point cloud maps includes: converting the depth images into 3D point cloud maps based on the internal parameters of the camera and the depth images.

In one embodiment, the method includes: converting the depth images to the 3D point cloud maps according to a formula $$D\begin{bmatrix}x_1\\y_1\\1\end{bmatrix} = KU = \begin{bmatrix}f_x & 0 & c_x\\0 & f_y & c_y\\0 & 0 & 1\end{bmatrix}\begin{bmatrix}x\\y\\z\end{bmatrix},$$

wherein D represents a depth value of one depth image, $(x_1, y_1)$ represents a pixel coordinate corresponding to the depth value in the depth image, K represents the internal parameters of the camera, and U represents a coordinate (x, y, z) of a point in the 3D point cloud maps.

At block 204, a curvature of a curved driving path of the vehicle is calculated based on a driving state of the vehicle.

In one embodiment, the driving state of the vehicle includes a straight driving state and a turning driving state. In one embodiment, the method further includes: determining the driving state of the vehicle. In one embodiment, determining the driving state of the vehicle includes: when a steering wheel angle of the vehicle is greater than or equal to a preset angle threshold from a central or straight-ahead position, determining that the vehicle is in the turning driving state; when the steering wheel angle of the vehicle is smaller than the preset angle threshold, determining that the vehicle is in the straight driving state.

In one embodiment, calculating the curvature of the curved driving path of the vehicle based on a driving state of the vehicle includes: when the driving state of the vehicle is the straight driving state, determining that there is no curve in the driving path, or that the curvature of the curved driving path of the vehicle is 0; when the driving state of the vehicle is the turning driving state, obtaining the speed of the vehicle and a steering wheel angle of the vehicle, and calculating the curvature of the curved driving path of the vehicle according to the speed of the vehicle and the steering wheel angle of the vehicle.

In one embodiment, the speed of the vehicle is obtained by using a speed sensor and the steering wheel angle is measured by using a steering wheel angle recorder.

In one embodiment, the curvature is a measure of how curved an originally straight line may be. In one embodiment, the vehicle is treated as a rigid body, being an object whose shape and size remain unchanged and relative positions of internal points remain unchanged.

In one embodiment, the method includes: calculating the curvature of the curved driving path of the vehicle according to a formula $$A = \frac{s}{\alpha},$$

wherein A is the curvature of the curved driving path of the vehicle, S is an arc length of a trajectory of the vehicle when the vehicle turns, and α is the steering angle of the vehicle. In one embodiment, the steering angle of the vehicle is calculated based on the steering wheel angle of the vehicle, and the arc length is calculated based on the speed of the vehicle.

At block 205, 3D regions of interest of the vehicle is determined from the 3D point cloud maps according to the size of the vehicle and the curvature.

Figure 3:
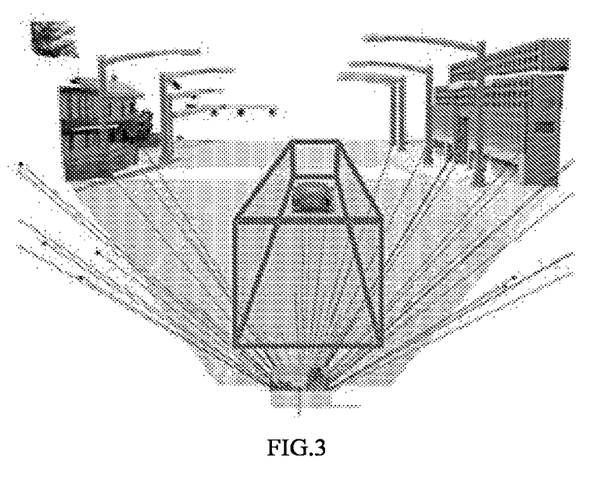
FIG. 3 is a schematic diagram of a 3D region of interest when a vehicle is traveling in a straight line.

In one embodiment, determining 3D regions of interest of the vehicle from the 3D point cloud maps according to the size of the vehicle and the curvature of the curved driving path of the vehicle includes: determining a length, a width and a height of the vehicle; determining a size of each 3D region of interest according to the length, the width, and the height of the vehicle; when the vehicle is in the straight driving state, that is, the curvature of the curved driving path of the vehicle is 0, determining the 3D regions of interest from the point cloud maps according to the length, the width, and the height of the vehicle. For example, referring to FIG. 3, one 3D region of interest can be a cube in shape.

In one embodiment, when the steering wheel angle of the vehicle is greater than or equal to the preset angle threshold, it is determined that the vehicle is in the turning driving state; when the steering wheel angle of the vehicle is smaller than the preset angle threshold, it is determined that the vehicle is in the straight driving status.

In one embodiment, when the vehicle is in a turning driving state, that is, the curvature of the curved driving path of the vehicle is not 0, the curvature is determined by block 204, and the size of the curved driving path on which the vehicle is driving is determined according to the curvature of the curved driving path of the vehicle.

In one embodiment, the method includes: determining a turning direction of the vehicle according to a turn signal of the vehicle or the steering wheel angle of the vehicle; determining a direction of deviation from the straight driving state and a degree of deviation of the 3D regions of interest according to the turning direction of the vehicle and the size of the curved path; determining the size of the 3D regions of interest according to the length, the width, and the height of the vehicle.

Figure 4:
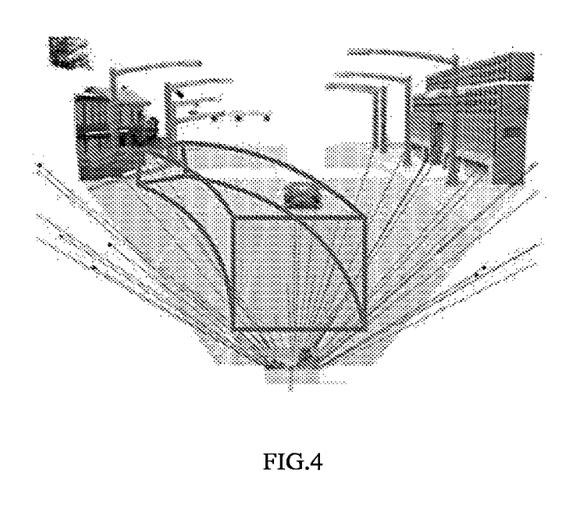
FIG. 4 is a schematic diagram of a 3D region of interest when the vehicle makes a turn.

In one embodiment, FIG. 4 illustrates the 3D regions of interest, the 3D regions of interest are determined according to the length, the width, height of the vehicle, the direction of deviation from the straight driving state and degree of deviation of the 3D regions of interest.

It should be noted that the length of the 3D regions of interest is the same as the length of the vehicle, the width of the 3D regions of interest is the same as the width of the vehicle, and the height of the 3D regions of interest is the same as the height of the vehicle.

The 3D regions of interest determined by the curvature of the curved driving path of the vehicle can accurately detect whether there is an obstacle in front of the vehicle when the vehicle is turning, thus improving a safety of driving of the vehicle.

At block 206, the 3D regions of interest are determined whether have obstacles.

In one embodiment, determining whether the 3D regions of interest have obstacles includes: an advanced driving assistance system is used to analyze whether the 3D regions of interest have obstacles, and obtaining a determination, and controlling the vehicle to continue moving or issuing an alarm according to the determination. In one embodiment, the determination includes the 3D regions of interest having obstacles and the 3D regions of interest which have no obstacles. When the 3D regions of interest have no obstacles, block 207 is executed, when the 3D regions of interest have an obstacle, block 208 is executed At block 207, the vehicle is controlled to continue driving.

At block 208, the vehicle is controlled to issue an alarm.

In one embodiment, the alarm includes a collision warning or an automatic braking alarm.

The above embodiments are only specific embodiments of the present application, but a protection scope of the present application is not limited to these. For those of ordinary skill in the art, improvements can be made without departing from the inventive concept of the present application, but these all belong to the protection scope of the present application.

FIG. 5 illustrates the electronic device 5. The electronic device 5 includes a storage 501, a processor 502, a computer program 503 stored in the storage 501, and at least one communication bus 504. In one embodiment, electronic device 5 can be an in-vehicle device. The in-vehicle device is provided on a vehicle, and the in-vehicle device may be an in-vehicle computer.

Those skilled in the art can understand that the schematic diagram shown in FIG. 5 is only an example of the electronic device 5, and does not constitute a limitation on the electronic device 5. Other examples may include more or less components than those shown in the drawings, or different combinations of components, or different components, for example, the electronic device 5 may also include input and output devices, network access devices, and the like.

The at least one processor 502 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The at least one processor 502 can be a microprocessor or the at least one processor 502 can also be any conventional processor, etc. The at least one processor 502 is the control center of the electronic device 5, using various interfaces and lines to connect various parts of the entire electronic device 5.

The storage 501 can be used to store the computer program 503, and the at least one processor 502 implements the electronic program by executing the computer program 503 stored in the storage 501 and calling up the data stored in the storage 501. The storage 501 may include a stored program area and a stored data area, wherein the stored program area may store an operating system, an application program required for at least one function (such as a sound playback function, an image playback function, etc.), etc. The storage data area may store data (such as audio data) created according to the use of the electronic device 5, etc. In addition, the storage 501 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

In one embodiment, the modules/units integrated in the electronic device 4 can be stored in a computer readable storage medium if such modules/units are implemented in the form of an independent product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM).

The exemplary embodiments shown and described above are only examples. Even though numerous characteristics and advantages of the present disclosure have been set forth in the foregoing description, together with details of the structure and function of the present disclosure, the disclosure is illustrative only and changes may be made in the detail, including in matters of shape, size, and arrangement of the parts within the principles of the present disclosure, up to and including the full extent established by the broad general meaning of the terms used in the claims.

What is claimed is:

1. A method for assisting safer driving comprising:
    obtaining RGB images of a scene in front of a vehicle;
    processing the RGB images based on a trained depth estimation model, and obtaining depth images corresponding to the RGB images;
    converting the depth images to three-dimensional (3D) point cloud maps;
    calculating a curvature of a curved driving path of the vehicle based on a driving state of the vehicle;
    determining 3D regions of interest of the vehicle from the 3D point cloud maps according to a size of the vehicle and the curvature;
    determining whether the 3D regions of interest have obstacles;
    when the 3D regions of interest having no obstacles, controlling the vehicle to continue driving; and
    when the 3D regions of interest having at least one obstacle, controlling the vehicle to issue an alarm.

2. The method as claimed in claim 1, further comprising:
    when a steering wheel angle of the vehicle is greater than or equal to a preset angle threshold, determining that the driving state of the vehicle is turning driving state;
    when the steering wheel angle of the vehicle is smaller than the preset angle threshold, determining that the driving state of the vehicle is straight driving state.

3. The method as claimed in claim 2, further comprising:
    when the driving state of the vehicle is the straight driving state, determining that the curvature is zero (0);
    when the driving state of the vehicle is the turning driving state, obtaining a speed of the vehicle and a steering wheel angle of the vehicle, and calculating the curvature according to the speed and the steering wheel angle of the vehicle.

4. The method as claimed in claim 3, further comprising:
determining a size of a curved driving path on which the vehicle is driving according to the curvature;
determining a turning direction of the vehicle according to a turn signal of the vehicle or the steering wheel angle of the vehicle;
determining a direction of deviation from the straight driving state and a degree of deviation of the 3D regions of interest according to the turning direction of the vehicle and the size of the curved driving path;
determining a size of the 3D regions of interest according to a length, a width and a height of the vehicle, the direction of deviation from straight and the degree of deviation.

5. The method as claimed in claim 1, wherein the depth estimation model comprises a depth estimation convolutional neural network and a pose estimation convolutional neural network.

6. The method as claimed in claim 5, further comprising:
training the depth estimation model, and obtaining the trained depth estimation model.

7. The method as claimed in claim 6, further comprising:
obtaining training images;
inputting the training images into the depth estimation convolutional neural network, and obtaining the depth images corresponding to the training images;
inputting adjacent frame images of the training images into the pose estimation convolutional neural network, and obtaining a pose information of a camera corresponding to the adjacent frame images;
reconstructing the training images based on the depth images, the pose information of the camera, and internal parameters of the camera corresponding to the RGB images, and obtaining reconstructed images;
calculating loss values between the training images and the reconstructed images by using a preset loss function;
adjusting parameters of the depth estimation model to minimize the loss values, and obtaining the trained depth estimation model.

8. The method as claimed in claim 7, further comprising:
calculating the reconstructed images according to a formula $P_{t+1} = K\hat{T}_{t \to t+1} \hat{D}(P_t) K^{-1} P_t$, wherein $P_{t+1}$ represents one reconstructed image, K represents the internal parameters of the camera, $\hat{T}_{t \to t+1}$ represents the pose information of the adjacent frame images, $\hat{D}(P_t)$ represents the depth value of a pixel coordinate $P_t$, $P_t$ represents one pixel coordinate of the training images.

9. The method as claimed in claim 1, further comprising:
converting the depth images into 3D point cloud maps based on internal parameters of a camera and the depth images.

10. The method as claimed in claim 9, further comprising:
converting the depth images to the 3D point cloud maps according to a formula $$D \begin{bmatrix} x_1 \\ y_1 \\ 1 \end{bmatrix} = KU = \begin{bmatrix} f_x & 0 & c_x \\ 0 & f_y & c_y \\ 0 & 0 & 1 \end{bmatrix} \begin{bmatrix} x \\ y \\ z \end{bmatrix},$$

wherein D represents a depth value of one depth image, $(x_1, y_1)$ represents a pixel coordinate corresponding to the depth value in the depth image, K represents the internal parameters of the camera, and U represents a coordinate (x, y, z) of a point in the 3D point cloud maps.

11. An electronic device comprising:
a processor; and
a non-transitory storage medium coupled to the processor and configured to store a plurality of instructions, which cause the processor to:
obtain RGB images of a front scene of a vehicle;
process the RGB images based on a trained depth estimation model, and obtain depth images corresponding to the RGB images;
convert the depth images to three-dimensional (3D) point cloud maps;
calculate a curvature of a curved driving path of the vehicle based on a driving state of the vehicle;
determine 3D regions of interest of the vehicle from the 3D point cloud maps according to a size of the vehicle and the curvature;
determine whether the 3D regions of interest have obstacles;
when the 3D regions of interest having no obstacles, control the vehicle to continue driving;
when the 3D regions of interest having at least one obstacle, control the vehicle to issue an alarm.

12. The electronic device as claimed in claim 11, wherein the plurality of instructions are further configured to cause the processor to:
when a steering wheel angle of the vehicle is greater than or equal to a preset angle threshold, determine that the vehicle is in a turning driving state;
when the steering wheel angle of the vehicle is smaller than the preset angle threshold, determine that the vehicle is in a straight driving state.

13. The electronic device as claimed in claim 12, wherein the plurality of instructions are further configured to cause the processor to:
when the driving state of the vehicle is the straight driving state, determine that the curvature is 0;
when the driving state of the vehicle is the turning driving state, obtain a speed of the vehicle and a steering wheel angle of the vehicle, and calculate the curvature according to the speed of the vehicle and the steering wheel angle of the vehicle.

14. The electronic device as claimed in claim 13, wherein the plurality of instructions are further configured to cause the processor to:
determine a size of the curved driving path on which the vehicle drives according to the curvature;
determine a turning direction of the vehicle according to a turn signal of the vehicle or the steering wheel angle of the vehicle;
determine a direction of deviation from straight driving state and a degree of deviation of the 3D regions of interest according to the turning direction of the vehicle and the size of the curved driving path;
determine the size of the 3D regions of interest according to the length, the width and the height of the vehicle, the direction of deviation from the straight driving state and the degree of deviation.

15. The electronic device as claimed in claim 11, wherein the depth estimation model comprises a depth estimation convolutional neural network and a pose estimation convolutional neural network.

16. The electronic device as claimed in claim 15, wherein the plurality of instructions are further configured to cause the processor to:

train the depth estimation model, and obtaining the trained depth estimation model.

17. The electronic device as claimed in claim 16, wherein the plurality of instructions are further configured to cause the processor to:

obtain training images;

input the training images into the depth estimation convolutional neural network, and obtain the depth images corresponding to the training images;

input adjacent frame images of the training images into the pose estimation convolutional neural network, and obtain a pose information of a camera corresponding to the adjacent frame images;

reconstruct the training images based on the depth images, the pose information of the camera, and internal parameters of the camera corresponding to the RGB images, and obtain reconstructed images;

calculate loss values between the training images and the reconstructed images by using a preset loss function;

adjust parameters of the depth estimation model to minimize the loss values, and obtain the trained depth estimation model.

18. The electronic device as claimed in claim 17, wherein the plurality of instructions are further configured to cause the processor to:

calculate the reconstructed images according to a formula $P_{t+1} = K\hat{T}_{t \to t+1}\hat{D}(P_t))K^{-1}P_t$, wherein $P_{t+1}$ represents one reconstructed image, K represents the internal parameters of the camera, $\hat{T}_{t \to t+1}$ represents the pose information of the adjacent frame images, $\hat{D}(P_t)$ represents the depth value of a pixel coordinate $P_t$, $P_t$ represents one pixel coordinate of the training images.

19. The electronic device as claimed in claim 11, wherein the plurality of instructions are further configured to cause the processor to:

convert the depth images into 3D point cloud maps based on internal parameters of a camera and the depth images.

20. The electronic device as claimed in claim 19, wherein the plurality of instructions are further configured to cause the processor to:

convert the depth images to the 3D point cloud maps according to a formula $$D \begin{bmatrix} x_1 \\ y_1 \\ 1 \end{bmatrix} = KU = \begin{bmatrix} f_x & 0 & c_x \\ 0 & f_y & c_y \\ 0 & 0 & 1 \end{bmatrix} \begin{bmatrix} x \\ y \\ z \end{bmatrix},$$

wherein D represents a depth value of one depth image, $(x_1, y_1)$ represents a pixel coordinate corresponding to the depth value in the depth image, K represents the internal parameters of the camera, and U represents a coordinate (x, y, z) of a point in the 3D point cloud maps.

* * * * *